United States Patent [19]

Gilmore et al.

[11] 4,054,261

[45] Oct. 18, 1977

[54] GUILLOTINE VALVE WITH IMPROVED SEALING MEANS

[75] Inventors: Thomas F. Gilmore; John E. Hughey, both of Birmingham, Ala.

[73] Assignee: Zurn Industries, Inc., Birmingham, Ala.

[21] Appl. No.: 683,643

[22] Filed: May 6, 1976

[51] Int. Cl.² .................................... F16K 31/05
[52] U.S. Cl. ................................ 251/130; 251/172; 251/267
[58] Field of Search ............... 251/58, 171, 172, 174, 251/175, 195, 159, 267, 130

[56] References Cited

U.S. PATENT DOCUMENTS

| 3,371,493 | 3/1968 | Woolley | 251/172 X |
| 3,504,883 | 4/1970 | Beck | 251/172 |
| 3,734,458 | 5/1973 | Tricini | 251/267 |

Primary Examiner—Harold W. Weakley
Attorney, Agent, or Firm—Hugh P. Carter

[57] ABSTRACT

A guillotine-type valve in which the plate thereof is sealed around all edges relative to the housing in which it operates, said seals being pressure assisted. Adjacent the periphery of the plate, including its upper and lower edges, are curved, flexible strips of sealing material which contact the opposite face surfaces of the plate near the edges to form the seal. Surrounding such seals is a chamber and means is provided to maintain such chamber under pressure greater than the pressure of the fluid being controlled by the valve.

1 Claim, 7 Drawing Figures

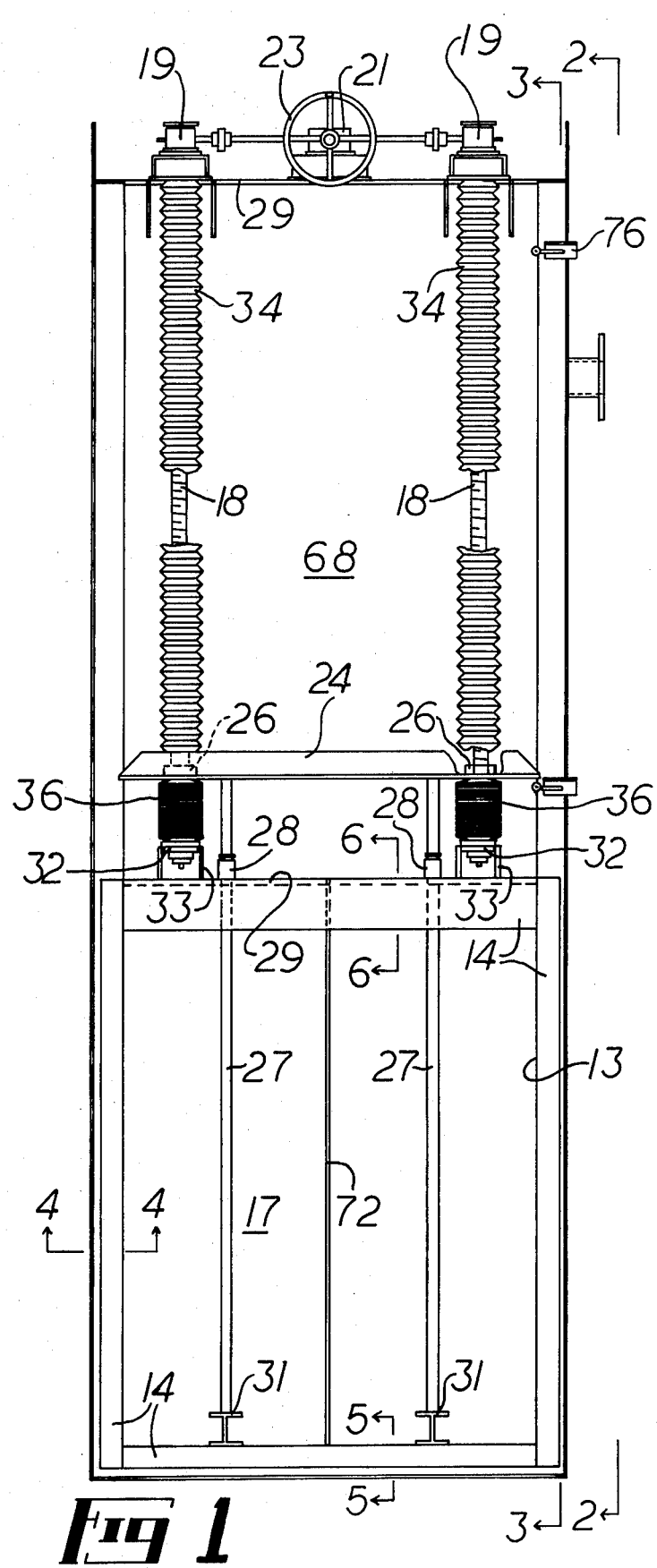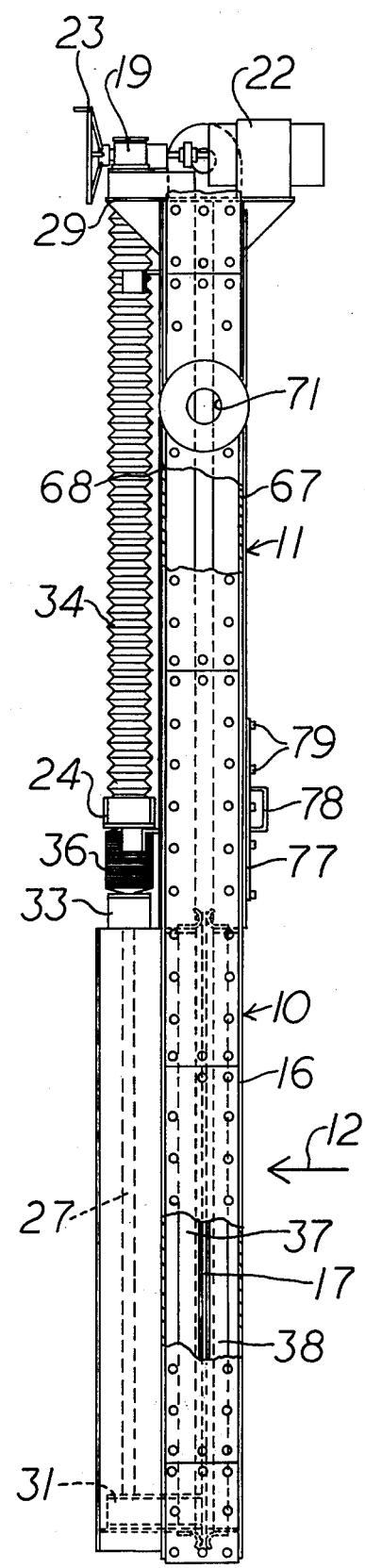
Fig 1
Fig 2

GUILLOTINE VALVE WITH IMPROVED SEALING MEANS

Our invention relates to guillotine valves, namely, valves of the sliding plate type, which are used to control flow of fluids such as air through various types of conduits, such, for instance, as air conduits around stream generating plants, heating plants, and the like.

Our invention has for an object the provision of an improved sealing means for guillotine valves which shall be more efficient than seals heretofore employed, which shall present a reduced amount of drag on the plate as it is moved on its opening or closing travel, and generally, to improve the quality and nature of the seal around such plates.

In this art, guillotine-type valves are used for closing ducts, particularly large ducts which may be conveying large volumes of air under positive or negative pressure. By way of example, a valve in accordance with the present disclosure is being manufactured in which the opening to be controlled is on the order of 15 feet by 12 feet. Heretofore, considerable difficulty has been encountered in maintaining the plate in sealing relation to the edges of the opening which it controls. Further if the fluid inside the duct work is under super-atmospheric pressure there is a tendency for some of the fluid being conveyed to seep through the various openings, around the seals. In the case of fluid carrying contaminants, the atmosphere is contaminated by the escape of such contaminants.

In a view of the foregoing our improved valve and sealing means comprises, with respect to the sides, top and bottom of the plate, a pair of oppositely disposed, thin, flexible sealing strips such, for instance, as stainless steel. These strips are anchored at one side adjacent the opening in which the plate slides and are disposed completely around the periphery of the plate valve. The plate is thus free to move from fully open position, with a sliding contact being maintained between the seals, or at least some of them, and the plate. Completely surrounding all of the seals we provide a chamber. Means is provided to maintain this chamber always under pressure which is slightly greater than the pressure of the fluid being conveyed. Thus, in every position and regardless of minor leaks which may occur around the seals, any fluid in the system which normally would escape into the atmosphere is, by the presence of the pressure just mentioned, forced back into the main stream being controlled. Furthermore, in our arrangement this protective feature of not permitting the escape of contaminants is present even when the valve is in partially open or partially closed position, all as will appear hereinafter.

A guillotine valve illustrating features of our invention is shown in the accompanying drawings forming a part of this application in which:

FIG. 1 is a front elevational view partly broken away;

FIG. 2 is a side elevational view taken generally along line 2—2 of FIG. 1, certain of the parts being broken away and in section;

Figure 3:
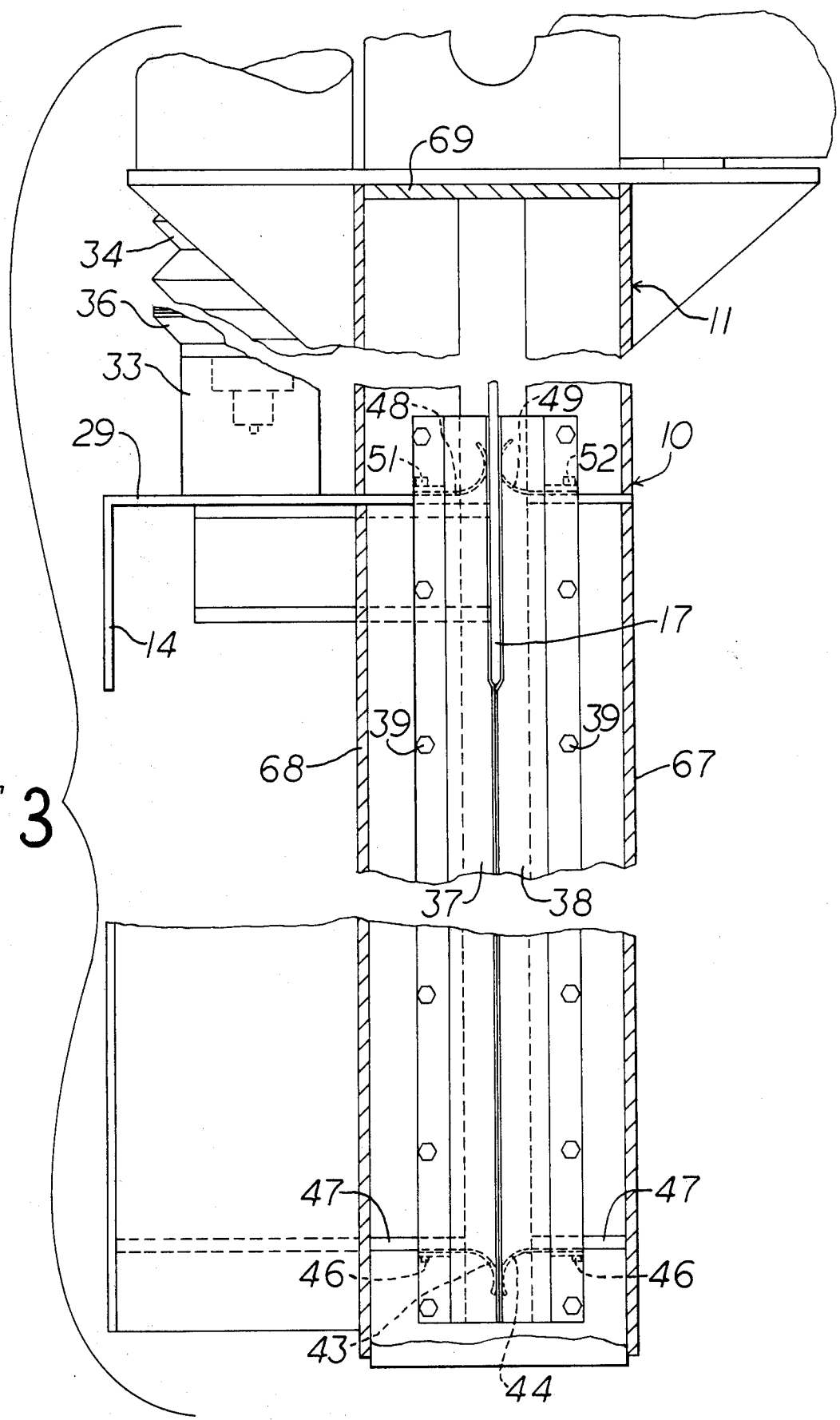
FIG. 3 is an enlarged, fragmental, detail sectional view taken generally along line 3—3 of FIG. 1, the view being fore-shortened in the vertical direction.

Referring now to the drawings for a better understanding of our invention, our improved valve comprises a lower section indicated generally by the numeral 10 and an upper section indicated generally by the numeral 11. It will be understood that fluid to be controlled, as for instance in a ductwork, not shown, may be permitted to flow through the valve in the direction of arrow 12, thus to exit from the opening 13. The opening 13 may have flanges 14, all around, to which the connecting ductwork may be attached. In similar fashion, there may be flanges 16 all around the upstream side of the opening to attach ductwork.

Mounted for vertical sliding movement from a lowered position as shown in FIGS. 1 and 2 to a raised position as shown in FIG. 3 is a valve plate 17. The plate may be raised and lowered by means of a pair of screws 18 the upper ends of which are connected to drive units 19. Between the screws is a double ended gear box 21 and the gear box may be driven, selectively, by an electric motor 22 or by a hand wheel 23. Suffice it to say that when either the hand wheel 23 or motor 21 is operated, the screws 18 rotate.

Extending between the screws is a cross bar 24. Fixedly mounted on the cross bar are nuts 26 in threaded engagement with the screws 18.

Depending from the cross bar 24 is a pair of rods 27 and these slide-in bushings 28 carried by a cross member 29 forming part of the framework. The lower ends of the rods are connected to members 31 which are fixed to the downstream surface of the plate 17.

Referring again to screws 18, the lower ends of the same are journalled in bearings 32 carried on brackets 33, the brackets being moved on the member 29. Also, it will be understood that the screws 18 are surrounded by upper, flexible boots 34 and lower, flexible boots 36, thus to keep the screws covered at all times.

Figure 7:
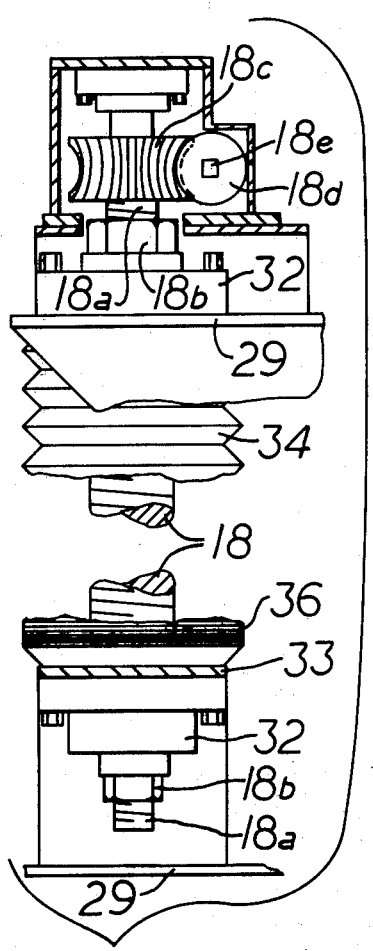

More in detail, the screws are supported so that when under load they are always in tension rather than in compression, thereby permitting the use of small diameter screws. As best shown in FIG. 7, the upper and lower ends of the screws are reduced and threaded as at $18^a$ to receive nuts $18^b$. An upper bearing $32^a$ rests on the upper cross member 29. Worm gears $18^c$ are keyed to the upper ends of the screws and worms $18^d$ on shafts $18^e$ extend between the gear box 21 and drive units 19. It will be noted that the bearings 32 are carried beneath the cross portion of the strap or member 33, and that this member 33 in turn is fixed, as before stated, to the cross member 29 of the framework.

From what has been described it will be seen that when either the motor 22 or hand wheel 23 is energized the screws rotate relative to the nuts 26, thus to raise the plate 17 from the position of FIGS. 1 and 2 to the upper, raised position of FIG. 3.

Since the screws are held against axial movement relative to the framework of the valve housing the weight of the valve plate 17 is so transmitted to the screws as to place the working lengths thereof in axial tension rather than in axial compression. Since the nuts 26 are fixed to the cross member 24 rotation of the screws puts the screws in tension between their upper ends and the nuts as the plate 17 is raised.

The foregoing description, generally stated, is of a somewhat standard guillotine valve. Our invention comprises the means for sealing, and maintaining a seal, around the edges of the plate 17. To this end we provide, along the vertical edges of the plate, a pair of seals 37 and 38. Each of these seals is identical and each may comprise a thin, flexible strip of material such as stainless steel having good flexing and bending properties. The seals 37 and 38 are anchored along one side by screws 39 threaded into the divided, fore and aft extending walls 41 and 42. It will be noted that the seals 37 and 38 are provided along both sides of the opening 13.

Along the bottom peripheral portion we provide seals 43 and 44, identical in all respects to the seals 37 and 38, and anchored by bolts 46 to a divided bottom wall 47 forming a part of the housing.

Figure 6:
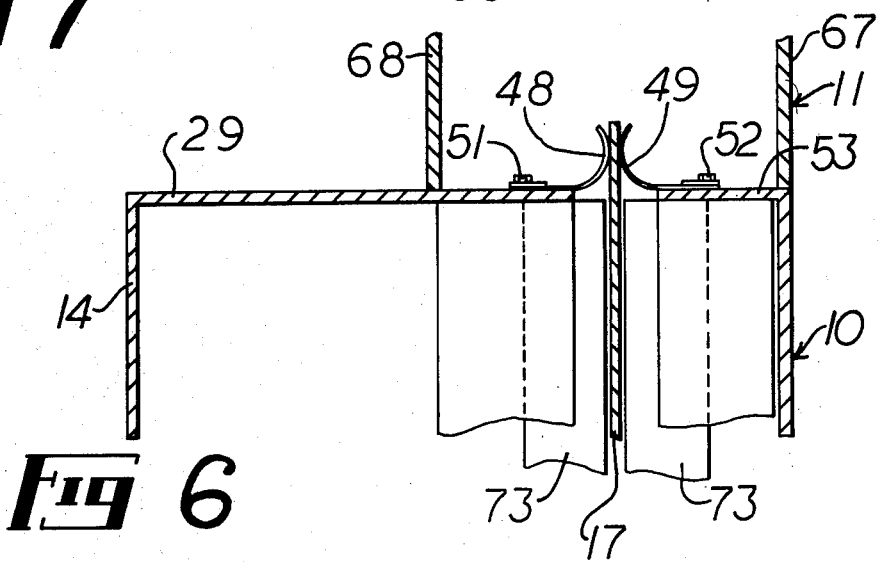
FIG. 6 is an enlarged detail sectional view taken generally along line 6—6 of FIG. 1; and, FIG. 7 is an enlarged, fragmental, sectional view showing how the screws for operating the valve plate are secured at each end against longitudinal movement.

Similarly as just described, and by reference particularly to FIG. 6, we show top seals 48 and 49 secured by bolts 51 and 52 to the top wall 29 and to a horizontal extension thereof indicated at 53.

Extending across the bottom of the entire lower section 10 is a plenum chamber 54 defined by bottom walls 56 and side walls 57 and 58, these walls being cntinuations of the walls 47. Also, the wall 56 preferably is removably connected to the walls 57 and 58 by nut and bolt combinations 59.

Figure 4:
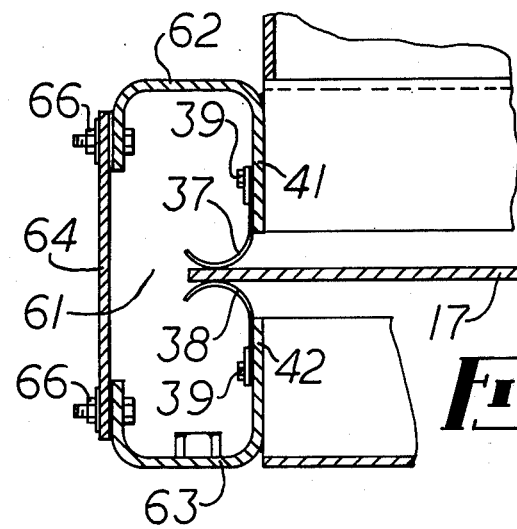
FIG. 4 is an enlarged detail sectional view taken generally along line 4—4 of FIG. 1.
Figure 5:
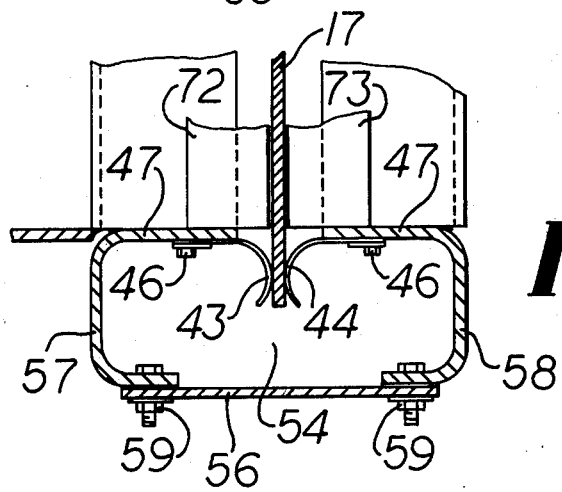
FIG. 5 is an enlarged detail sectional view taken generally along line 5—5 of FIG. 1.

As shown in FIG. 4 around the section 10 we provide a plenum chamber 61, this being defined by side walls 62 and 63 and an outer wall 64. The walls 62 and 63 are extensions of the walls 41 and 42, respectively, and the wall 61 may be removably held in place by nut and bolt combinations 66.

The entire upper section 11, that is, above the sliding plate 17, is closed by means of front and rear walls 67 and 68, a top wall 69 and the divided wall 53 which carries the seals 48 and 49.

Fluid under pressure, such for instance as air, may be supplied to the entire space surrounding the seals through an opening 71 whereby, all of the seals become pressure assisted, that is, are urged into sealing engagement with the plate 17. We provide enough pressure to the opening 71 to assure that the plenum chambers, including the entire upper portion 11 above the plate 17 always is under greater pressure than the fluid being controlled by the valve.

In order to assist the guiding of the plate and to relieve some of the pressure on the seals we provide vertical guides 72 and 73 located adjacent the center of the plate. These are secured at their upper and lower ends to the appropriate portions of the framework.

From the foregoing it will be apparent that we have devised an improved, simplified and efficient guillotine valve with improved seal means. In actual practice our invention has proven to be extremely satisfactory. That is to say, by maintaining pressure on the seals as indicated we achieve a continuing, even and sufficient sealing pressure, which is quite readily variable simply by changing the pressure in the plenums. Furthermore, any tendency of the valve to leak around the plate is counteracted by excess pressure in the plenum over the pressure inside the duct being controlled, thus to prevent contamination of the atmosphere with dust particles or the like which may be carried along by the air stream being controlled. Due to the flexible nature of the seals used in our valve, foreign matter is removed therefrom on each reciprocation of the plate.

Further, our invention lends itself to automation, and to this end we show a downward limit switch 74 and an upper limit switch 76. In a manner well understood in the art, these may be employed automatically to control the upper and lower positions of the plate inasmuch as these switches may be operated by the cross member 24.

As a specific example of a use to which our invention may be advantageously put, the assignee of this application is building a guillotine valve having a plate 17 of a size to control a 15 by 12 foot duct conveying flue gases from coal- fired boilers at a temperature above 300° F at a pressure of about 17 inches water column. We contemplate, in this instance, maintaining a pressure of about 22 inches water column in the plenums, onto the seals.

Our tests on a smaller size valve indicate that in the large valve just mentioned we can expect to have substantially zero leakage of the upstream gases when the valve is closed. This contrasts with prior valves of this type in which one would expect measurable leakage.

It will further be noted that the seals of our improved valve all are accessible because the walls adjacent the same are removable. Obviously, and while we have not herein mentioned the same, gaskets are used between such plates and the flanges of the housing. Furthermore, in order to get at the upper seals 48 and 49 we provide an access door 77 with a handle 78 thereon which is held in place by appropriate fasteners 79. By removing this door, access may be had to the upper seals.

While we have shown our invention in but one form, it will be obvious to those skilled in the art that it is not so limited but is susceptible of various changes and modifications without departing from the spirit thereof.

What we claim is:

1. In a valve for controlling fluids under pressure different from atmospheric pressure and of the kind having a plate-like closure movable from closed to open position relative to an opening, the improvement comprising,
   a. seal means located about the periphery of the opening to be closed by the closure and cooperatively sealing between the walls of the opening and the movable closure,
   b. means to apply fluid pressure to the seals which is of a magnitude in excess of the pressure being controlled by the closure,
   c. a pair of power driven screws for moving the plate-like closure from open to closed position,
   d. means mounting each of the screws for rotation but held against axial movement,
   e. nuts on the screws intermediate the ends thereof, and
   f. means operatively connecting the nuts to the closure, effective upon rotation of the screws in a given direction to move the closure and to impart the stress of moving the closure as a tension load on the screws.

* * * * *